(12) United States Patent
Hawkins

(10) Patent No.: US 6,935,268 B1
(45) Date of Patent: Aug. 30, 2005

(54) FLAG CLAMPING DEVICE

(76) Inventor: Mark W. Hawkins, 2626 Medlin Rd., Monroe, NC (US) 28112

( * ) Notice: Subject to any disclaimer, the term of this patent is extended or adjusted under 35 U.S.C. 154(b) by 0 days.

(21) Appl. No.: 10/900,833

(22) Filed: Jul. 28, 2004

Related U.S. Application Data

(60) Division of application No. 10/197,137, filed on Jul. 17, 2002, now Pat. No. 6,899,053, which is a continuation-in-part of application No. 29/132,238, filed on Nov. 6, 2000, now Pat. No. Des. 448,702.

(51) Int. Cl.$^7$ .................................................. G09F 17/00
(52) U.S. Cl. ................................... 116/173; 116/28 R
(58) Field of Search .................... 116/173, 174, 28 R; 403/282–283, 219, 316–317, 344

(56) References Cited

U.S. PATENT DOCUMENTS

| | | | | |
|---|---|---|---|---|
| 410,221 A | * | 9/1889 | Thompson | 116/174 |
| 1,036,168 A | * | 8/1912 | Updike | 116/173 |
| 1,296,072 A | * | 3/1919 | Gillespie | 248/539 |
| 2,013,271 A | * | 9/1935 | Greenhoe | 248/539 |
| 2,906,234 A | * | 9/1959 | Scott | 116/173 |
| 3,162,409 A | * | 12/1964 | Straayer et al. | 248/514 |
| 3,438,651 A | * | 4/1969 | Hertoghe et al. | 116/173 |
| 3,729,780 A | * | 5/1973 | White | 24/704.2 |
| 3,905,681 A | * | 9/1975 | Nagel | 359/533 |
| 4,120,561 A | * | 10/1978 | Burkholder | 359/525 |
| D335,254 S | * | 5/1993 | Carter | D8/354 |
| 6,672,243 B2 | * | 1/2004 | Seymour et al. | 116/28 R |

* cited by examiner

Primary Examiner—Christopher W. Fulton
Assistant Examiner—Tania Courson
(74) Attorney, Agent, or Firm—Jason S. Miller

(57) ABSTRACT

The present invention is directed to a garment clamping device for bicycles, motor bikes or other transportation vehicles upon which a flag or banner may be secured and displayed. The clamping device comprises two generally rectangular shaped halves which are joined together by a hinge strap mechanism. Each half has at least one aperture and at least one corresponding mounting stud for clamping the two halves together. Further, each half has at least one barb and at least one corresponding aperture located on the other half for holding and supporting a display flag after the apparatus is clamped closed. Extending outwardly from the bottom of one half is a shaft and a clamping means for securing the apparatus to a tubular member or handlebar of a bike. In operation, a garment is placed on one of the halves and the device is manipulated into a closed position such that the mounting stud, barbs, and respective apertures are engaged. Thereafter, the clamping means is positioned around a tubular member of a bicycle, such as a handlebar, and secured in a closed position.

15 Claims, 3 Drawing Sheets

FLAG CLAMPING DEVICE

CROSS REFERENCE TO RELATED APPLICATIONS

This is a Divisional Application of Continuation-In-Part application Ser. No. 10/197,137 filed Jul. 17, 2002, now U.S. Pat. No. 6,899,053, of application Ser. No. 29/132,238 now issued U.S. Pat. D448,702, filed Nov. 6, 2000.

FIELD OF THE INVENTION

The present invention relates to an apparatus for supporting flags and banners on bicycles, and more particularly pertains to an apparatus which supports and removably displays flags or banners on the handles bars of bicycles, motor bikes or other transportation vehicles.

BACKGROUND OF THE INVENTION

Often it is desirable for an individual to display a symbol or word(s) from a bicycle or motor bike. These displays take many forms and are used for many purposes, including but not limited too advertising athletic teams, professional organizations, political groups, safety signals, etc. Some individuals place stickers on their bikes, others place flags or banners on their bikes and some prefer to place signs thereon. Each of the currently known methods and devices have certain disadvantages. By way of example, stickers and magnetic signs are hard to position and can damage the surface of the bike, thus reducing its resale value. Moreover, stickers are typically low and poorly located. Thus, the desired display is not effective.

By way of another example, most flags or banners are difficult to attach to a bike without interfering with the operation of the same. The present art relating to the use of flags on bikes focuses on various types of attachment systems. The use of an attachment system which affixes the flag to an axle, typically the rear axle, on the bike is employed by most people. This system has several drawbacks. One such drawback is that the device may become misaligned and interfere with the operation of the bike.

Another type of attachment system is one which attaches a flag to a handlebar of a bike. These systems are typically intended to be permanent and, in the case of removable systems, the flag may slide or move from its original position.

While the above described known devices may fulfill their respective, particular objectives and requirements, the aforementioned references do not describe an apparatus for supporting and removably displaying flags on bicycles, motor bikes and other transportation vehicles which will maintain its position on the bike. Therefore, it can be appreciated by those skilled in the art that there exists a continuing need for new and improved apparatus for supporting flags on bicycles and the like which can be used for removably positioning flags on antennas of automobiles. In this regard, the apparatus for supporting flags on bicycles, motor bikes and the like according to the present invention substantially departs from the conventional concepts and designs of the prior art, and in doing so provides an apparatus primarily developed for the purpose of removably positioning flags on bicycles of which have a greater life cycle and which maintains its position.

SUMMARY OF THE INVENTION

Generally, the present invention is directed to a garment clamping device (hereinafter referred to as "clamp") which is used with bicycle handle bars. The clamp is used to display a flag or banner from the handle bars of a bicycle or motor bike. The clamp is configured so that the flag is always providing maximum visibility. The clamp generally comprises two generally elongated rectangular-shaped substantially identical halves which may or may not be joined together in a closed position around a garment. Extending from either half is a shaft and a zip clamp which may be joined in a closed position around the handle bars of a bike. In a preferred embodiment, the clamp is provided with a connection means wherein a first half of the clamp is provided with at least one projecting stud and the second half is provided with a corresponding mating aperture adapted for snap engagement with the stud. Moreover, the clamp is provided with a garment securing means wherein a second half of the clamp is provided with at least one barb and the first half is provided with a corresponding aperture for receiving the barb. The barbs of the clamp are used to secure a flag or banner in place while the clamp is in the closed position. The studs and corresponding apertures are used to maintain the clamp in a snap together closed position.

Intermediate and connecting the halves is a flexible hinge strap mechanism. The hinge mechanism is configured to allow manipulation of the clamp into a closed position thereby forming a generally circular cavity. In addition, a small cap is provided which projects from the top of the clamp.

In operation, a flag or garment type material is placed on the barbs and the clamp is manipulated via the hinge into a closed position. Thereafter, a portion of the handle bar is placed in the recurve of the zip clamp, and the zip clamp is manipulated into a closed position.

OBJECTS OF THE INVENTION

The principal object of the present invention is to provide an improved apparatus for supporting a flag or banner on the handle bars of a bicycle or other transportation vehicle.

A further object of the present invention is to provide an improved apparatus for supporting a flag or banner on the handle bars of a bicycle or other transportation vehicle which does not introduce safety hazards and which prominently displays the flag in a high visible position when the bicycle is parked or driven.

A still further object of this invention is to provide an improved apparatus for supporting a flag or banner on the handle bars of a bicycle or other transportation vehicle which is easily removed and replaced.

These together with other objects of the invention, along with various features of novelty which characterize the invention, are pointed out with particularity in the claims annexed to and forming a part of the disclosure. For better understanding of the invention, its operating advantages and the specific objects attained by its uses, reference should be had to the accompanying drawings and descriptive matter which there is illustrated preferred embodiments of this invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings in which.

Figure 1:
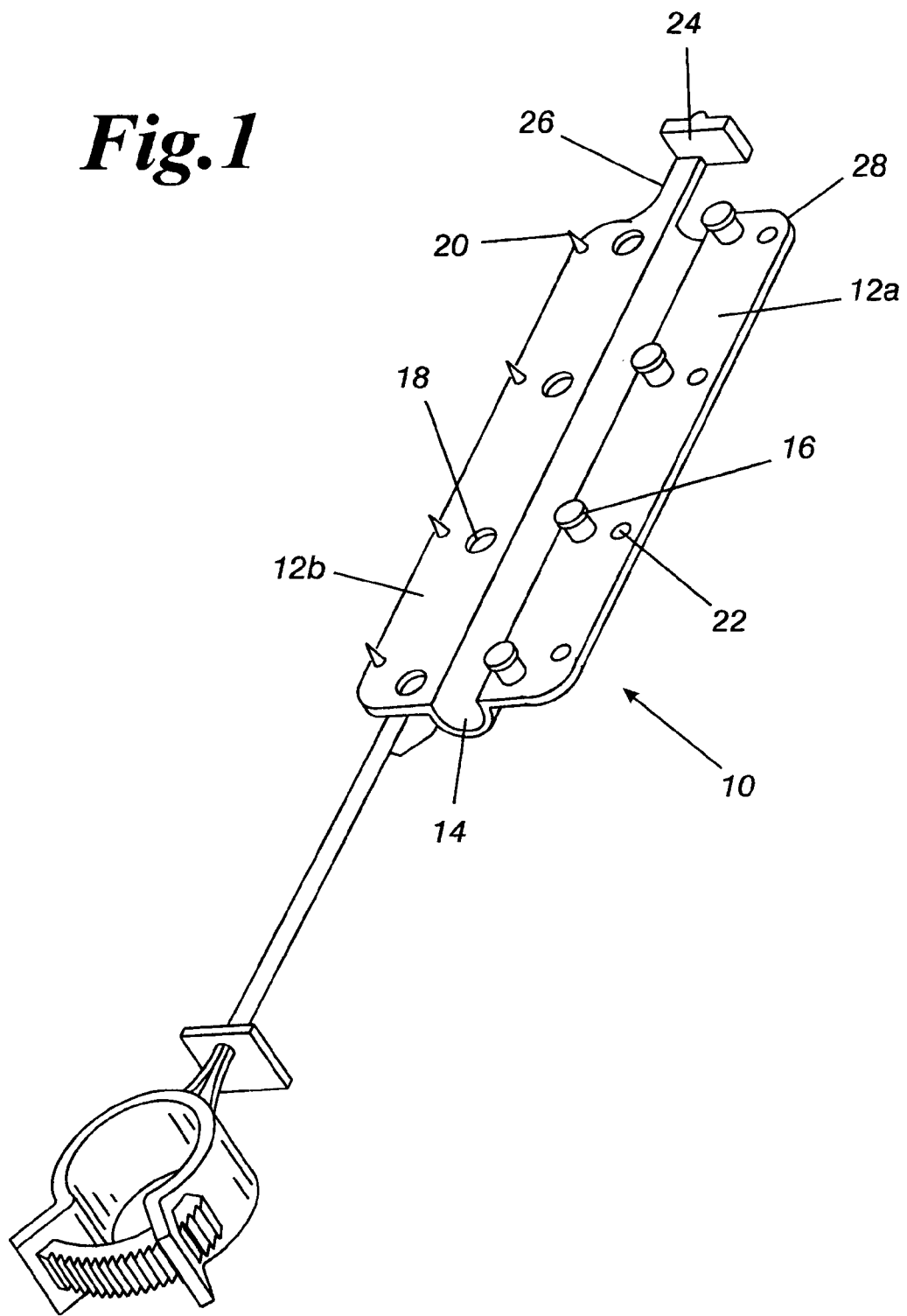
FIG. 1 is a perspective view of a preferred embodiment of the flag clamp in the open position.
Figure 2:
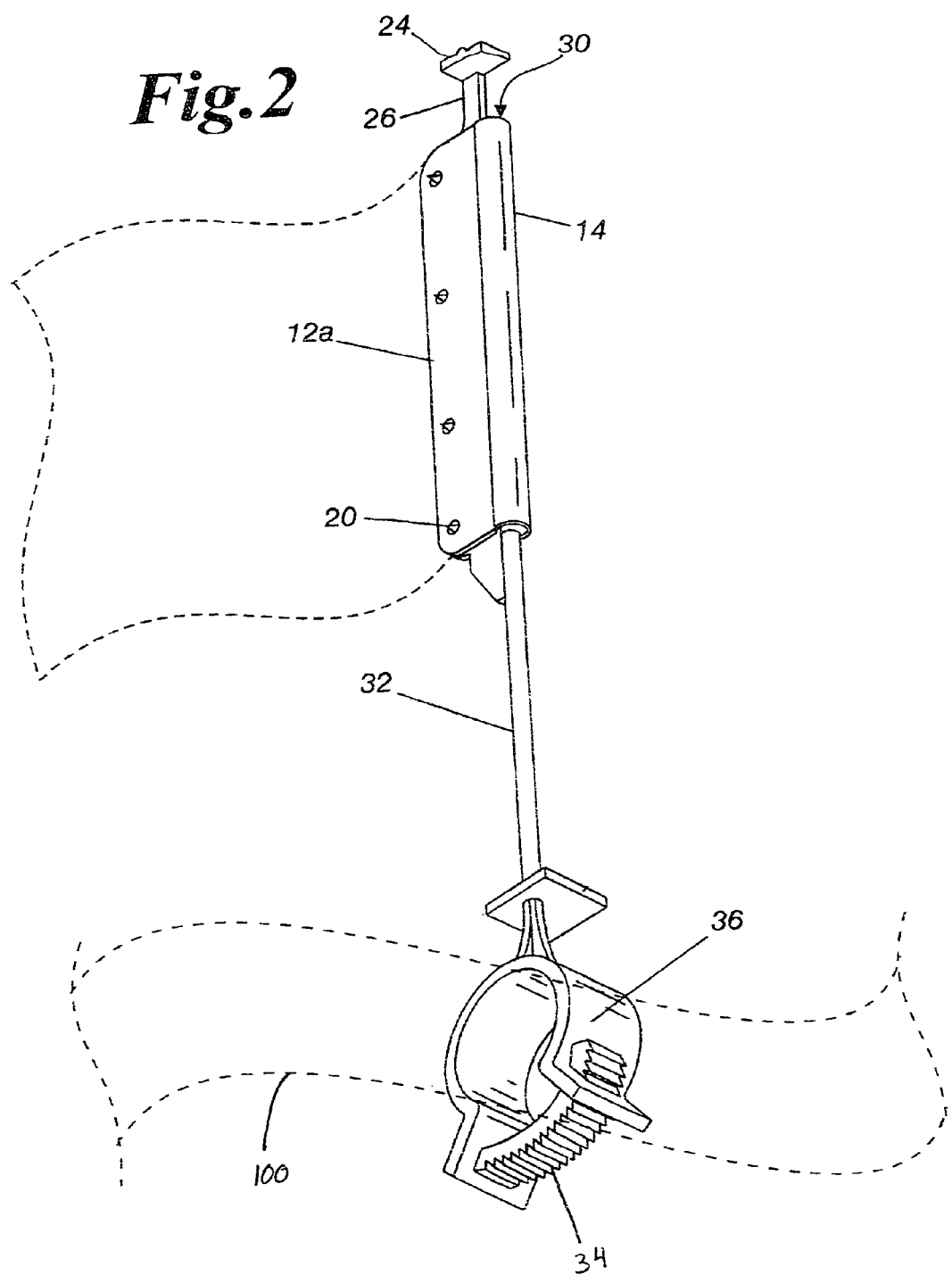
FIG. 2 is a perspective view of the present invention in the closed position.

It is to be understood that the drawings are merely illustrative of the invention and are not meant to limit the claims. Various modifications and additions may be made to the apparatus by those skilled in the art, without departing from the spirit and scope of this invention, which is therefore understood to be limited only by the scope of the appended claims. Further, the same reference numerals refer to the same parts throughout the various Figures.

DETAILED DESCRIPTION

As required, detailed embodiments of the present invention are disclosed herein. However, it is to be understood by one of ordinary skill in the art that the present discussion is a description of exemplary embodiments only and is not intended as limiting the broader aspects of the present invention, which broader aspects are embodied in the exemplary construction.

The present invention is preferably unitary in construction and is useful with any plastic or other elastomeric material or any combination thereof. By unitary, it is meant that the present invention is formed as one continuous apparatus as opposed to separate parts which are joined to form one apparatus. Suitable plastics are recycled plastics, injection molded plastics, reinforced plastics or the like generally comprised of polyethylene, polypropylene, and polyvinylchloride. Further, the described configuration can be in different sizes and shapes to correspond to different designs and characteristics of handlebars, flags and other tubular members.

In view of the foregoing disadvantages inherent in the known types of devices for supporting flags now present in the prior art, the present invention provides an improved apparatus for supporting flags on handlebars of bicycles or other transportation vehicles. As such, the general purpose of the present invention, which will be described subsequently in greater detail, is to provide a new and improved apparatus for supporting flags on handlebars of bicycles or other transportation vehicles which has all the advantages of the prior art and none of the disadvantages.

Referring now to the drawings, a preferred embodiment of the present invention is shown in FIGS. 1–4. In FIGS. 1–4, the shown flag clamp 10 is generally comprised of a first half 12a and a second half 12b. The two halves 12a, 12b are substantially similar in configuration and generally comprise an elongate rectangular member having opposing inner and outer sides 13a, 13b, respectively. Each half also has opposing first and second ends, 15a, 15b, respectively. The sides 13a, 13b of the halves 12a, 12b are dimensioned so as to have a greater length than the ends 15a, 15b. The inner sides 13a of the halves 12a, 12b are joined together by a hinge strap mechanism 14 displaced intermediate therein. The outer sides 13b of the respective halves 12a, 12b have rounded edges 28 located at the corners. By using the hinge strap 14, preferably integrally formed with the halves 12a, 12b, the halves 12a, 12b will always be aligned for proper connection as explained herein. Preferably, the disclosed clamp 10 is approximately 4.5" long and 1.7" wide in construction. Further, the halves 12a, 12b of the clamp 10 preferably measure 0.5 inches in width, 6 inches in length, and 0.05 inches in thickness. The connecting hinge 14 is most effective with a thickness of approximately 0.02" for these dimensions.

Figure 3:
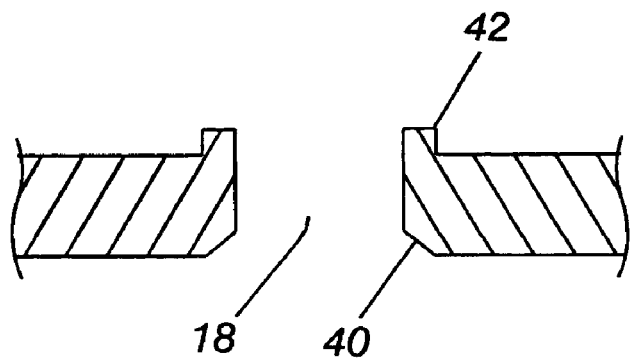
FIG. 3 is a fragmentary view illustrating the connection means in the open position.
Figure 4:
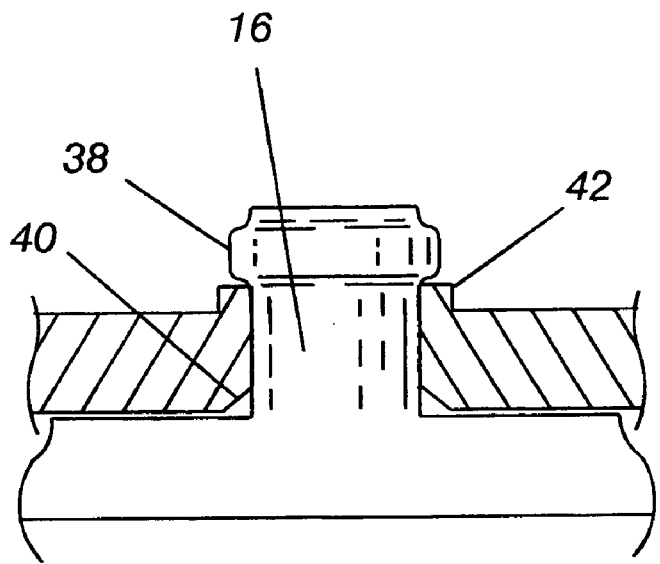
FIG. 4 is a fragmentary view illustrating the connection means in the closed position.

A connection means is provided for connecting the halves 12a, 12b together and maintaining them in the closed position. The connection means generally has at least one cylindrically shaped projecting member, or stud 16, mounted on the first half 12a of the clamp 10. A corresponding and mating first aperture 18 is located in the second half 12b for snap engagement thereto. As can be seen in FIGS. 3 and 4, the stud 16 is optionally provided with a snap ring 38 located substantially at the outward projecting end for snap engagement with the corresponding first aperture 18. Also, the corresponding aperture 18 is configured so that its receiving side 40 is tapered to permit slideable engagement with the stud 16. Finally, the exit side of the aperture 18 is optionally provided with a snap rim 42.

In operation, the first half 12a is manipulated so that the stud 16 is aligned and matingly engaged with the aperture 18 for a secure fit, thereby keeping the device in a closed position (See, FIG. 4). The optional snap ring 38 and snap rim 42 add extra security to the clamp 10 when it is in the closed position as the snap ring 38 overlaps the snap rim 42 after the clamp 10 has been manipulated into the closed position. The use of the above connection means provides the ability to close and open the clamp 10 as described without affecting the structural integrity of the clamp 10. It will be appreciated by those skilled in the art that the cylindrically shaped studs 16 can take on various other shapes and configurations, provided they will mate with an aperture of like configuration in a male/female connecting relationship. Moreover, it will be appreciated that the projecting stud 16 can be on the second half 12b with the aperture 18 located on the opposing half.

The hinge strap mechanism 14 used in the present invention is sometimes known as a living hinge. The hinge strap 14 is flexible in construction and connects the two halves 12a, 12b. When the apparatus is positioned closed, a cavity 30 is defined.

Also provided, is a garment securing means generally comprised of at least one barb 20 located on the second half 12b with a corresponding second aperture 22 located on the opposing half 12a. The barbs 20 are used to securely retain a flag or garment material which is placed thereon. Upon snapping the clamp 10 together the barbs 20 and second aperture 22 are perfectly aligned so that the barbs 20 are centered in the second aperture 22 of each opposing half and barely protrude through the opposing half. There is optionally an arm extension 26 protruding from the top of the second half 12b of the clamp 10. This extension 26 has affixed to it a small cap 24 which is flat on the underside.

An elongated shaft 32 having a zip clamp 36 located at its distal end. The zip clamp 36 generally has a C-shaped configuration wherein a first distal end is provided with a toothed strip 34 extending therefrom and a second distal end is provided with an opening for receiving the toothed strip 34. The zip clamp 36 can be attached to a tubular member 100 such as the front handle bar of a bicycle or like vehicle by stretching open the zip clamp 36 and positioning it over and around the handlebar. Thereafter, the toothed strip 34 is passed through the opening of the second distal end and tightened closed. The elongated shaft 32 is made of flexible plastic material which can easily bend or collapse if impacted. The use of the flexible shaft prevents sharp protruding edges from being exposed to a user thereby providing a greater safety factor.

SUMMARY OF THE ACHIEVEMENT OF THE OBJECTS OF THE INVENTION

From the foregoing, it is readily apparent that I have invented an improved apparatus for supporting a flag or banner on the handlebar of a bicycle or other transportation vehicle.

Further, it is apparent that I have invented an improved apparatus for supporting a flag or banner on the handlebar of a bicycle or other transportation vehicle which does not introduce safety hazards and which prominently displays the flag in a high visible position when the automobile is parked or driven.

Still further, it is apparent that I have invented an improved apparatus for supporting a flag or banner on the handlebar of a bicycle or other transportation vehicle which is easily removed or replaced.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A garment clamping device for bicycles comprising:
   a first half having a generally rectangular configuration;
   a second half having a substantially similar configuration as the first half;
   a hinge intermediate the first and second halves, wherein the hinge is flexible and may be manipulated into a closed position;
   a tubular shaft extending from the bottom of the second half;
   a zip clamp affixed to the distal end of the shaft for attachment to a tubular device;
   a connection means for securing the clamping device in the closed position;
   a garment securing means for securing the garment within the first half and second half of the clamping device; and
   wherein the clamping device is of a unitary construction, wherein the connection means is comprised of at least one projecting stud located on either the first or second half and at least one first aperture located in a corresponding position on the opposing half, and
   wherein the securing means comprises a barb for piercing the garment on the half opposing the projecting stud and a second aperture on the half with the projecting stud, said second aperture being located and adapted in a corresponding position for matingly receiving said barb, wherein the second aperture is a through hole.

2. The garment clamping device of claim 1 wherein said projecting stud comprises a cylindrical shape and has a snap ring located at its distal end for added security after snap engagement with the first aperture.

3. The garment clamping device of claim 1 wherein said barbs comprise a conical shape.

4. The garment clamping device according to claim 1 further comprising a cap extending from the first half.

5. The garment clamping device of claim 1 wherein said first aperture for receiving said projecting stud comprises a tapered entry point and elevated rim portion at its exit.

6. The garment clamping device of claim 1 wherein said device is manufactured by injection molding an elastomeric material.

7. The garment clamping device of claim 6 wherein the elastomeric material is selected from a group consisting of polypropylene, polyethylene, or polyvinyl chloride.

8. A garment clamping device for use with a transportation vehicle comprising:
   a first generally rectangular half, said first half comprising at least one projecting stud and at least one aperture;
   a second half having substantially similar shape to the first half, said second half comprising at least one barb located in a corresponding position to the aperture and at least one hole located in a corresponding position to the projecting stud;
   a hinge mechanism connected intermediate the first and second halves;
   a tubular shaft extending from the bottom of the second half;
   a zip clamp affixed to the distal end of the shaft for attachment to a tubular device; and
   wherein each of said first and second halves are configured for receiving a garment, being manipulated and secured in a closed position by snap engagement of the projecting stud and the hole such that the garment is secured within the first and second halves; and
   wherein the device is of a unitary construction.

9. A garment clamping device for use with transportation vehicles comprising:
   a unitary body having a first and second half;
   a flexible hinge strap connected intermediate the first and second halves;
   a connection means for securing the first and second halves together;
   a tubular shaft extending outwardly from the bottom of either the first or second half;
   a clamping means affixed to the distal end of the shaft; and
   wherein the clamping means is fitted around a tubular member and manipulated into a closed position;
   wherein the garment is placed on one of the first and second halves and the body is closed and held in place within the first and second halves by connection means so that the garment is retained in a fixed position;
   wherein the connection means comprises:
      at least one projecting stud extending from either the first or second half;
      at least one mating aperture in a corresponding position to the projecting stud located on the half opposing the projecting stud for snap engagement;
      at least one barb located on either half; and
      at least one corresponding aperture for receiving the barb located on the opposing half,
   wherein the corresponding aperture is a through hole.

10. The garment clamping device according to claim 9 wherein said at least one barb has a conical shape.

11. The garment clamping device according to claim 9 wherein the projecting stud is cylindrical and further comprises a snap ring located at its distal end.

12. The garment clamping device of claim 9 wherein said device is comprised of an elastomeric material.

13. The garment clamping device of claim 12 wherein the elastomeric material is selected from a group consisting of polypropylene, polyethylene, or polyvinyl chloride.

14. The garment clamping device according to claim 9 wherein the device is manufactured by injection molding.

15. The garment clamping device according to claim 9 wherein the aperture for receiving the projecting stud is tapered at the entrance and is provided with a rim at its exit.

* * * * *